March 13, 1962 H. W. TREVASKIS ET AL 3,025,209
PLY TURNING DEVICE FOR USE IN THE MANUFACTURE
OF PNEUMATIC TYRES
Filed Nov. 18, 1959 2 Sheets-Sheet 1
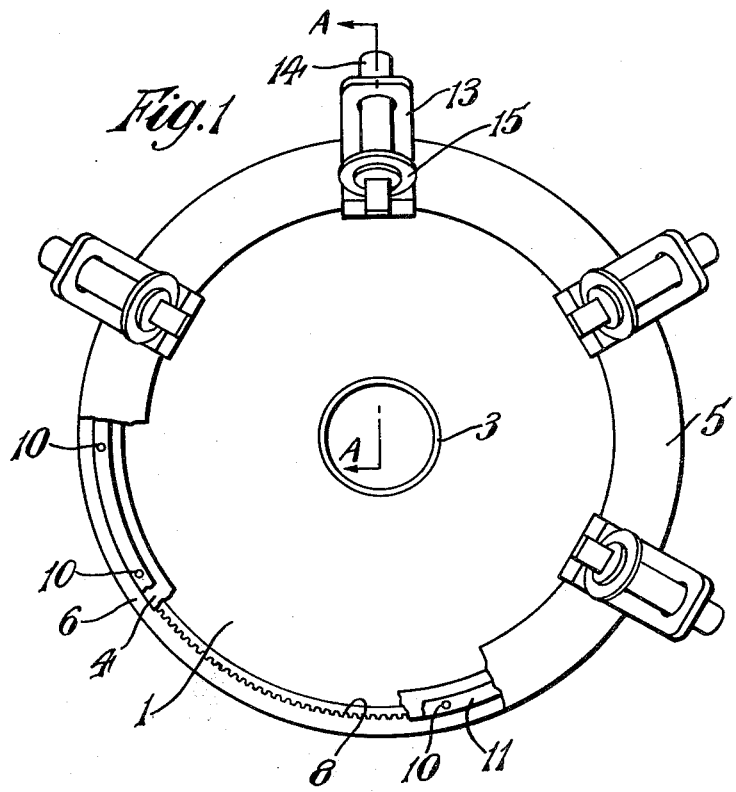
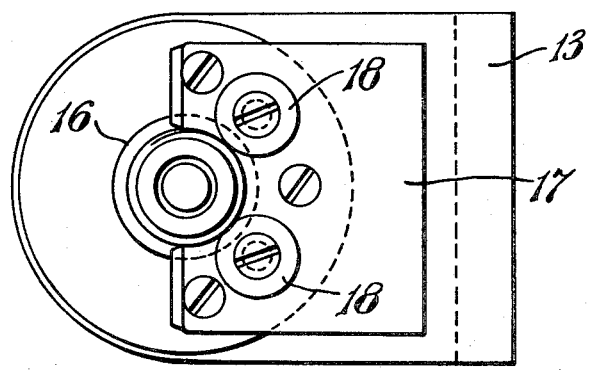
INVENTORS
Henry William Trevaskis
Ronald Jesse Barber
by their attorney

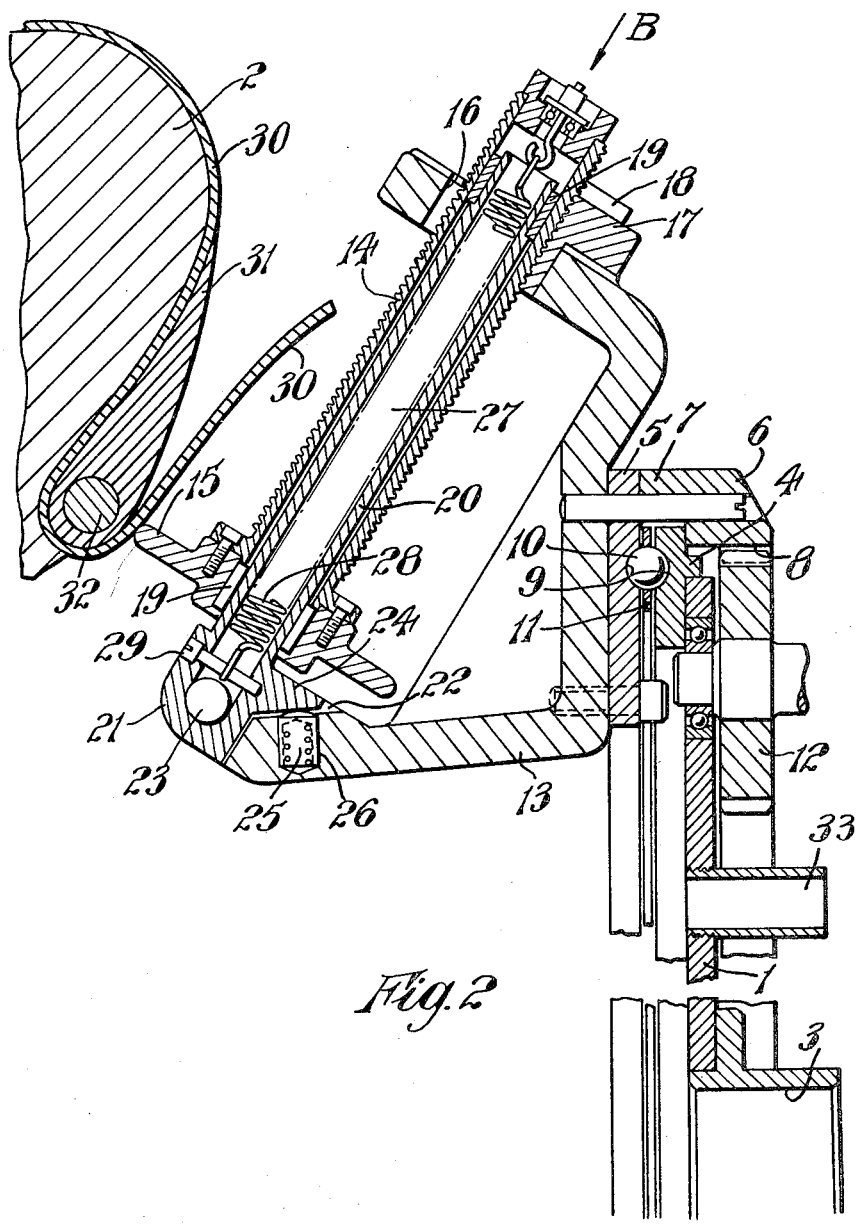

3,025,209
PLY TURNING DEVICE FOR USE IN THE MANUFACTURE OF PNEUMATIC TYRES

Henry William Trevaskis, Point Pleasant, Blackdown, near Leamington Spa, and Ronald Jesse Barber, Erdington, Birmingham, England, assignors to Dunlop Rubber Company Limited, London, England, a company of Great Britain
Filed Nov. 18, 1959, Ser. No. 853,913
Claims priority, application Great Britain Nov. 29, 1958
16 Claims. (Cl. 156—400)

This invention relates to a ply turning device for use in the manufacture of pneumatic tyres, that is to say a device for use in turning the side portions of tyre carcass plies down the sides of crown formers upon which partially shaped tyre carcasses are built, or for turning the plies up around the bead wires. Normally a tyre building former is rotatable about its central axis which is stationary and plies are turned by a device such as a roller engaging a ply on the former at one point on its periphery and the former is then rotated so that the roller rolls around the whole periphery. The present invention is applicable to a tyre building apparatus in which the former is stationary during the ply turning operations. An example of such an apparatus is described in co-pending application Serial No. 849,200, now U.S. Patent No. 2,997,095.

According to the present invention a ply turning device comprises a roller, rotatable about its axis, for mounting with its axis in substantially radial relation adjacent the side of a tyre building former so as to be movable axially with respect to the former and revolvable about the axis thereof so that the roller can be caused to engage a ply on the former, and on revolving about the former axis will roll round the ply so as to consolidate it against the former, means being provided for moving the roller radially with respect to the former as it travels round so as to turn the ply and consilidate it progressively across the side of the former.

Preferably the device includes several such rollers mounted on angularly spaced spindles so as to engage a ply on the former at circumferentially spaced positions. Preferably the spindles are uniformly spaced.

One embodiment of the invention will now be described, by way of example, with reference to the accompanying drawings in which:

FIGURE 1 is an end elevation of apparatus for turning and consolidating plies of a tyre.

FIGURE 2 is a transverse sectional view on line A—A of FIGURE 1 drawn to a somewhat larger scale.

FIGURE 3 is a view in the direction of arrow B of FIGURE 2.

The ply turning device comprises an annular mounting plate 1 of diameter approximately equal to the shoulder diameter of a tyre building former 2, as shown in FIGURE 2, having an axial sleeve 3 secured in its central aperture for slidably engaging a shaft on the axis of the former. On one side of the mounting plate 1, at its outer edge is concentrically secured an annular ring 4 of outer diameter slightly greater than that of the plate 1. A ring 5 of outer diameter slightly greater than that of the ring 4 is rotatably and coaxially anchored to the same side of the mounting plate as the ring 4, so that the ring 4 is positioned between them, by an annulus 6 coaxially disposed at the other side of the mounting plate having an integral short cylindrical flange 7 which extends across the mounting plate and is secured to the ring 5. Gear teeth are formed around the inner circumferential surface 8 of the anulus 6 and are used for rotating it and the ring 5 as will be described. The confronting faces of the rings 4 and 5 each have an annular bearing channel 9 around which ball bearings 10 are equally spaced in locating apertures in an annular cage 11 positioned between the rings.

Rotatably mounted on the plate 1 so as to mesh with the gear teeth of the annulus 6 is a pinion 12 which may be driven by any suitable means to rotate the ring 5 about its axis.

A plurality of substantially U-shaped brackets 13 are secured by their bases to and equally spaced around the ring 5 on its side remote from the plate 1. The limbs of each of the brackets 13 extend radially and axially outwardly from the ring 5 so that they will lie approximately perpendicular to the side of the crown former with which the device is to be used when it is coaxially mounted alongside the former.

An externally screw-threaded tube 14 is mounted, substantially parallel to the general slope of the side of the former, between the limbs of each of the brackets 13, the tubes being thus radially disposed and each having a narrow roller 15 with smooth rounded edges concentrically secured to its radially innermost end. The radially outermost part of each tube 14 extends through a bore 16 in the outermost limb of the bracket 13, and engages complementary screw threads in a semi-circular groove of a nut member 17 secured to the limb on the side of the bore axially away from the former. Two small ball races 18 are positioned on the radially outermost face of the nut 17 to contact the tube 14 and take any radial load exerted on it, thus preventing the parts from becoming jammed when their threads are in mesh during use. The bore 16 is of diameter such that the tube 14 may be moved radially clear of the nut 17 so that it disengages the threads and may be moved axially through the bore.

Each tube 14 is slidably and rotatably mounted, by bearings 19, on a cylindrical guide member 20 having an enlarged end 21 of substantially square cross-section which is pivotally mounted in a slot 22 in the end of the innermost limb of the bracket 13, by a transverse pin 23 so that the guide member and tube can swing so as to engage or disengage the screw threads from the tube from the nut member 17. The end 21 of the guide member has a short flange 24 which extends across the outer face of the innermost limb of the member 13 and passes over a spring loaded plunger 25 received in a recess 26 in the limb, such that the plunger will exert a radially outward pressure on the flange, tending to swing the guide member 20 and the tube 14 in an anti-clockwise direction as seen in FIGURE 2, so as to disengage the screw threads. The guide member 20 has a counter-bore 27 from its radially outermost end, terminating at the transverse bore containing the pin 23. A tension spring 28 fastened at one end to the radially outermost part of the tube 14 passes down the bore 27 and is fastened at its other end to a pin 29 passed through the enlarged end 21.

Thus when the device is applied coaxially to the former it can be pressed axially towards the former to engage each roller 15 on it. Due to the force imparted to each roller the spring loaded plunger 25 is compressed and the tube 14 is swung into the nut 17, their threads meshing. On rotation of the ring 5 by means of the pinion 12, to revolve the brackets 13 and their rollers 15 about the former axis, each roller will roll around the former and the action of the screw threads will cause each roller 15 and tube 14 to move radially outwardly through the nut 17 thereby causing the spring 28 to be extended, the rollers thus rolling round the former on a path of ever-increasing radius. At the end of the operation the device can be moved axially away from the former whereupon the spring loaded plunger will swing the tube 14 away from the nut 17, thereby allowing the spring 28 to pull the tube and roller inwardly into their initial positions. By this means the rollers will be in their correct positions at any time that they may be required for use.

In use of the device, for example for turning a ply up around a bead wire and consolidating it on the side of the former, a ply 30 is fitted on the former 2 in a substantially cylindrical condition, and turned down the sides of the former. Fillers 31 and bead wires 32 are fixed in position and the ply is then turned partly round the bead wire by some suitable means, for example by hand. The device is then coaxially applied to the former and the plate 1 is pressed axially inwardly so that the rollers 15 which are in their radially innermost position, engage the ply under pressure so as to consolidate it against the side of the former as shown in FIGURE 2. The dimensions of the brackets 13 and associated parts are such that in the initial position of the rollers the points on their peripheries nearest to the former lie a distance from the former axis approximately equal to the bead radius of tyres to be built, so that when the device is first applied the rollers will engage the ply directly over the bead 32. Whilst the plate is held under axial pressure the ring 5 and annulus 6 are rotated by means of the pinion 12 to cause the rollers to roll around the former with constantly-increasing radius, as described. As the rollers roll around the ply and move outwardly they produce a smooth turn up of the ply around the bead and up around the fillers, applying pressure and consolidating the ply progressively outwardly from the bead. The device is then moved axially outwardly from the former whereupon the rollers 15 and tubes 14 are returned inwardly to their initial positions.

The device may be used for consolidating any rubber components onto the side of the former, for example the sidewalls of the tyre may be applied by this method.

A convenient means of moving the device axially and holding it in engagement with the former whilst the ply is consolidated by the rollers is a vacuum operated collapsible bellows as described in application of Trevaskis, Ser. No. 853,627, filed November 17, 1959. For this purpose the face of the plate 1 which will be towards the former is flat and smooth and has a connection for a vacuum pipe 33, as shown in FIGURE 2. The bellows is slipped on the shaft before the device is applied and the flat face of the latter engages a seal at the end of the bellows. By applying a vacuum to the pipe connection in the plate the bellows can be caused to adhere both to the plate and to the former centre, and to collapse, drawing the device towards and firmly against the side of the former. As the rollers 15 move radially outwardly from the bead region and approach the sidewall of the tyre, it may be desirable to apply the device with somewhat less axial force than is required when the rollers are operating over the beads, in order to avoid damage to the sidewalls regions. For this purpose a leak valve may be provided in the vacuum system to allow limited entry of air and thus reduce the depression in the bellows.

Although in the embodiments described, for turning plies up over bead wires, the rollers are mounted to move radially outwardly as they revolve around the former axis, it will be understood that the invention is equally applicable to turning plies or other tyre components radially inwardly. For this purpose the embodiment described could be modified by fitting alternative brackets 13 with pivots for the guide members 20 on their radially outer arms, and bores 16 and nuts 17 in their radially inner arms, the direction of rotation of the annulus 6 and ring 5 on operation being such as to cause the rollers 15 and tubes 14 to move radially inwardly.

Having now described our invention, what we claim is:

1. A ply-turning device for turning a side portion of a tyre carcass on the side of the crown former which comprises a roller, a carriage for said roller slidable about the axis of the former, a bracket mounted on said carriage for rotation relative to, and about the axis, of the former and means to mount said roller rotatably on said bracket on an axis extending in a radial direction alongside the side of the former to engage the periphery of said roller tangentially to a ply on the side of the former and to move said roller radially outwardly as said bracket and roller rotate relative to the side of said former.

2. A device according to claim 1 wherein the roller is mounted with its axis substantially parallel to the general slope of the side of the former.

3. A device according to claim 1 wherein the mounting of the roller includes screw-threaded means threaded on said bracket and rotatable with said roller to cause it to move radially with respect to the former.

4. A device according to claim 3 wherein the mounting includes a screw-threaded tube to which the roller is secured and a complementary screw-threaded member engaging said tube.

5. A device according to claim 4 wherein the complementary member is part-circular whereby the tube can be moved laterally to disengage the respective screw-threads.

6. A device according to claim 5 including spring means for urging the tube normally out of engagement with the complementary member, the spring means being overcome by reaction when the roller is caused to engage the former or a ply thereon whereby on withdrawal of the roller at the end of its operation the spring means will disengage the tube from the complementary member and enable the tube and roller to return radially to their original positions without rotation.

7. A device according to claim 6 wherein the bracket comprises a U-shaped portion and a guide member carrying said screw-threaded tube and pivotally connected to one arm of said U-shaped portion and extending across to the other arm thereof, and wherein the complementary screw-threaded member is mounted in the said other arm of said bracket.

8. A device according to claim 1 including spring means for returning the roller radially to its original position at the end of its operation.

9. A device according to claim 7 wherein the spring means is a tension spring connected between the guide member and the tube.

10. A device according to claim 9 wherein said carriage comprises a bracket supporting ring revolvably mounted about an axial shaft of the former.

11. A device according to claim 10 wherein said carriage comprises a mounting plate on which said ring is revolvably mounted and having a central sleeve for slidably engaging the shaft of the former.

12. A device according to claim 11 wherein the ring has gear teeth around its circumference and the carriage comprises a pinion engaging said teeth whereby on rotation of the pinion the ring may be caused to revolve.

13. A device according to claim 1 including a plurality of rollers for engaging the former or a ply thereon at spaced points around its circumference.

14. A device according to claim 13 wherein the several rollers are circumferentially uniformly spaced.

15. A device according to claim 1 wherein the roller has an initial position distant from the axis of the former by approximately the radius of the bead region thereof, and is movable radially outwardly on operation for turning plies outwardly.

16. A device according to claim 1 wherein the roller has an initial position distant from the axis of the former by at least the maximum radius of the former, and is movable radially inwardly on operation for turning plies inwardly.

References Cited in the file of this patent

FOREIGN PATENTS 522,424    Great Britain _____ June 18, 1940